(12) United States Patent
Zhang et al.

(10) Patent No.: US 11,683,523 B2
(45) Date of Patent: Jun. 20, 2023

(54) GROUP OF PICTURES BASED PATCH PACKING FOR VIDEO BASED POINT CLOUD CODING

(71) Applicant: TENCENT AMERICA LLC, Palo Alto, CA (US)

(72) Inventors: Xiang Zhang, Sunnyvale, CA (US);
Wen Gao, West Windsor, NJ (US);
Xiaozhong Xu, State College, PA (US);
Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/497,326

(22) Filed: Oct. 8, 2021

(65) Prior Publication Data

US 2023/0011096 A1    Jan. 12, 2023

Related U.S. Application Data

(60) Provisional application No. 63/219,237, filed on Jul. 7, 2021.

(51) Int. Cl.
| | |
|---|---|
| *H04N 19/597* | (2014.01) |
| *H04N 19/172* | (2014.01) |
| *H04N 19/177* | (2014.01) |
| *H04N 19/105* | (2014.01) |

(52) U.S. Cl.
CPC ......... *H04N 19/597* (2014.11); *H04N 19/105* (2014.11); *H04N 19/172* (2014.11); *H04N 19/177* (2014.11)

(58) Field of Classification Search
None
See application file for complete search history.

(56) References Cited

U.S. PATENT DOCUMENTS

| | | | |
|---|---|---|---|
| 2017/0347120 A1* | 11/2017 | Chou | H04N 19/86 |
| 2019/0156518 A1* | 5/2019 | Mammou | G06T 5/001 |
| 2019/0200046 A1* | 6/2019 | Lucas | G06V 20/48 |
| 2020/0045344 A1* | 2/2020 | Boyce | H04N 21/816 |
| 2020/0153885 A1* | 5/2020 | Lee | G06T 15/04 |

(Continued)

OTHER PUBLICATIONS

International Search Report dated Jan. 26, 2022, issued by the International Searching Authority in application No. PCT/US2021/054553.

(Continued)

*Primary Examiner* — Chikaodili E Anyikire
(74) *Attorney, Agent, or Firm* — Sughrue Mion, PLLC

(57) ABSTRACT

Methods and apparatuses of encoding a video stream encoded using video point cloud coding include obtaining a plurality of frames including a first frame and remaining frames, wherein each frame of the plurality of frames is packed with a corresponding plurality of patches; grouping the remaining frames into a first group and a second group, wherein frames grouped into same group are temporally neighboring; processing the first frame; parallel processing frames in the first group after the first frame is processed; and generating an encoded video stream based on the processed first frame and the processed frames in the first group, wherein at least one frame of the first group depends from the first frame.

20 Claims, 12 Drawing Sheets

(56) References Cited

U.S. PATENT DOCUMENTS

2020/0280730 A1* 9/2020 Wang ............... H04N 19/86

OTHER PUBLICATIONS

Written Opinion dated Jan. 26, 2022, issued by the International Searching Authority in application No. PCT/US2021/054553.
Christian Tulvan et al., "Use Cases for Point Cloud Compression (PCC)", International Organisation for Standardisation Organisation Internationale De Normalisation ISO/IEC JTC1/SC29/WG11 Coding of Moving Pictures and Audio, ISO/IEC JTC1/SC29/WG11 MPEG2015/ N16331, 2016 (8 pages total).
Rufael Mekuria et al., "Requirements for Point Cloud Compression", International Organisation for Standardisation Organisation Internationale De Normalisation ISO/IEC JTC1/SC29/WG11 Coding of Moving Pictures and Audio, ISO/IEC JTC1/SC29/WG11 MPEG2016/n16330, 2016 (3 pages total).
"V-PCC Codec Description", ISO/IEC JTC 1/SC 29/WG 7, WG 7, MPEG 3D Graphics Coding, 2020 (73 pages total).

* cited by examiner

210

GROUP OF PICTURES BASED PATCH PACKING FOR VIDEO BASED POINT CLOUD CODING

CROSS-REFERENCE TO RELATED APPLICATION

This application claims priority from U.S. Provisional Application No. 63/219,237, filed on Jul. 7, 2021, the disclosure of which is incorporated herein by reference in its entirety.

FIELD

This disclosure is directed to a set of advanced video coding technologies, more specifically, video based point cloud compression including group of pictures (GoP) based patch packing.

BACKGROUND

Advanced three-dimensional (3D) representations of the world are enabling more immersive forms of interaction and communication. They also allow machines to understand, interpret, and navigate our world. Point clouds have been widely used as a 3D representation of the world. For example, they may be used in autonomous driving vehicles for object detection and localization; in geographic information systems (GIS) for mapping, and in cultural heritage to visualize and archive cultural heritage objects and collections, etc. Several use cases associated with point cloud data have been identified, and some corresponding requirements for point cloud representation and compression have been developed.

Point clouds contain a set of high dimensional points, for example three dimensional (3D), each including 3D position information and additional attributes such as color, reflectance, etc. They can be captured using multiple cameras and depth sensors, or Lidar in various setups, and may be made up of thousands up to billions of points to realistically represent the original scenes.

Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic cloud.

SUMMARY

In embodiments, a method of encoding a video stream using video point cloud coding, the method is performed by at least one processor and includes obtaining a plurality of frames including a first frame and remaining frames, wherein each frame of the plurality of frames is packed with a corresponding plurality of patches; grouping the remaining frames into a first group and a second group, wherein frames grouped into same group are temporally neighboring; processing the first frame; parallel processing frames in the first group after the first frame is processed; and generating an encoded video stream based on the processed first frame and the processed frames in the first group, wherein at least one frame of the first group depends from the first frame.

In embodiments, an apparatus for encoding a video stream using video point cloud coding includes at least one memory configured to store program code; and at least one processor configured to read the program code and operate as instructed by the program code, the program code including: obtaining code configured to cause the at least one processor to obtain a plurality of frames including a first frame and remaining frames, wherein each frame of the plurality of frames is packed with a corresponding plurality of patches; grouping code configured to cause the at least one processor to group the remaining frames into a first group and a second group, wherein frames grouped into same group are temporally neighboring; processing code configured to cause the at least one processor to process the first frame; first parallel processing code configured to cause the at least one processor to parallel process frames in the first group after the first frame is processed; and generating code configured to cause the at least one processor to generate an encoded video stream based on the processed first frame and the processed frames in the first group, wherein at least one frame of the first group depends from the first frame.

In embodiments, a non-transitory computer-readable medium storing computer instructions for encoding a video stream using video point cloud coding that, when executed by at least one processor, cause the at least one processor to: obtain a plurality of frames including a first frame and remaining frames, wherein each frame of the plurality of frames is packed with a corresponding plurality of patches; group the remaining frames into a first group and a second group, wherein frames grouped into same group are temporally neighboring; process the first frame; parallel process frames in the first group after the first frame is processed; and generate an encoded video stream based on the processed first frame, the processed frames in the first group, wherein at least one frame of the first group depends from the first frame.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

Embodiments of the present disclosure relate to an annealing iterative geometry smoothing to avoid oversmoothing in an iterative smoothing framework. Embodiments of the present disclosure relate to using a combination of average and median statistics to derive the reference points aiming to reduce the computational complexity of using the pure median.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
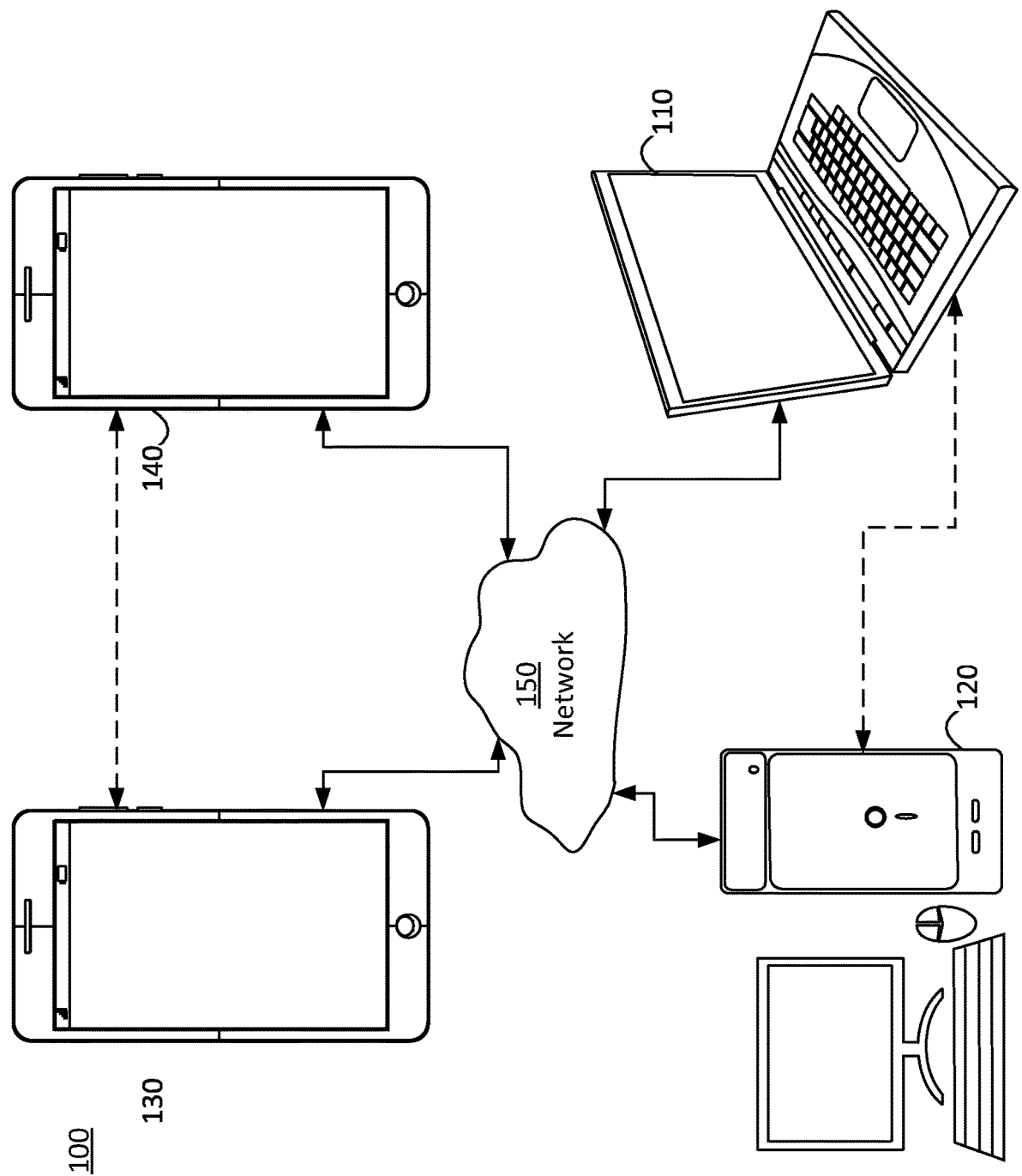
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
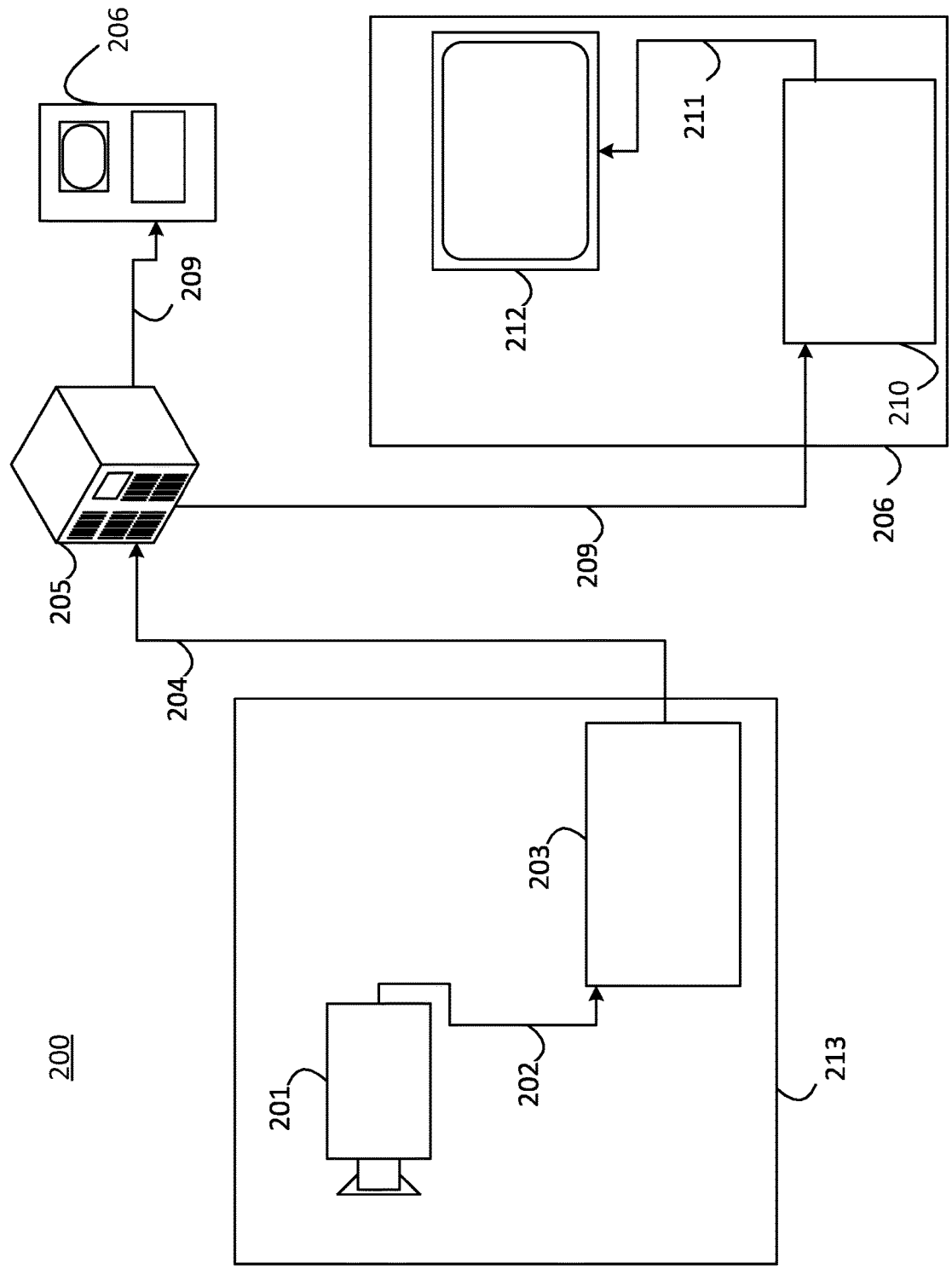
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
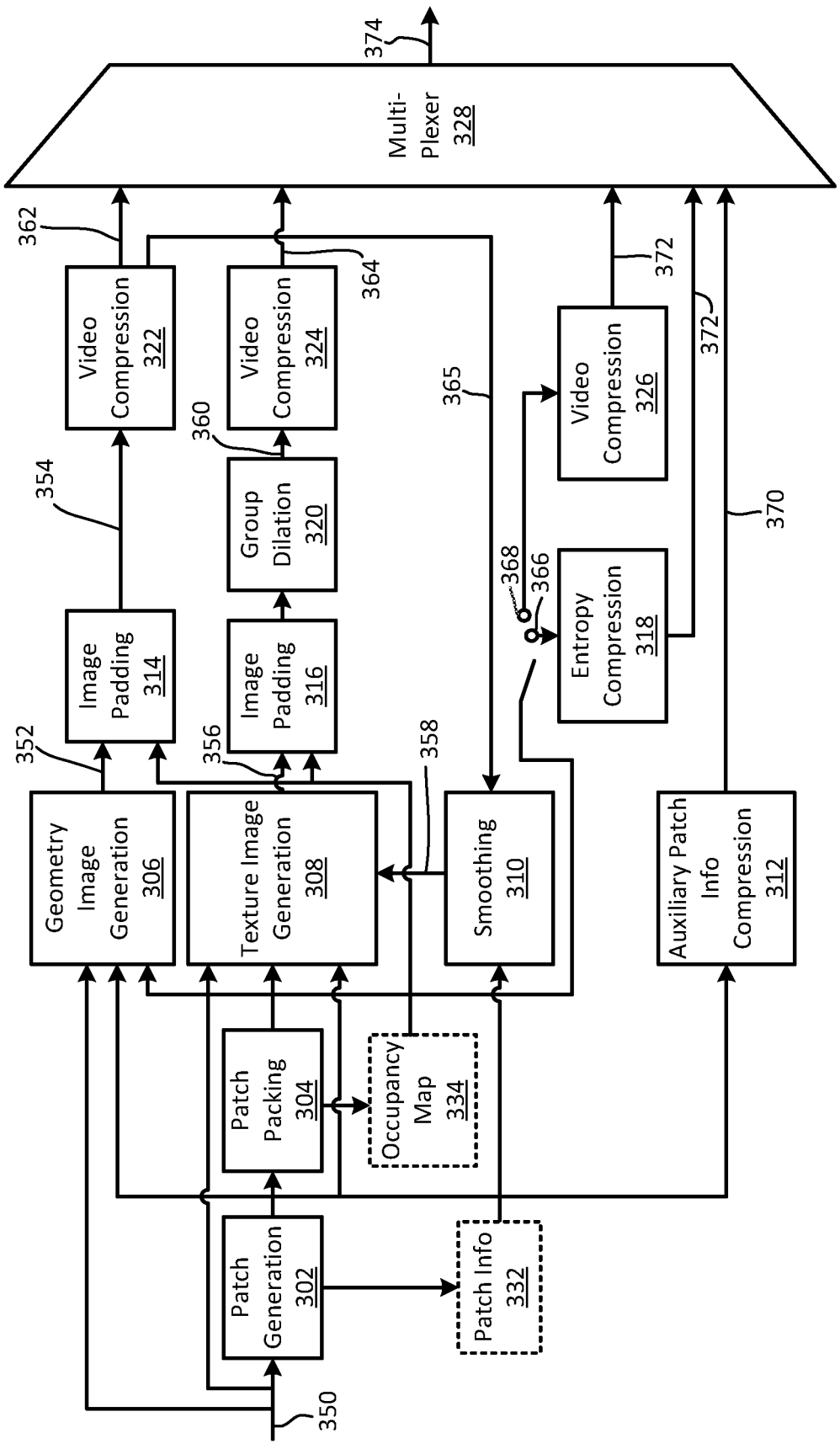
FIG. 3 is a schematic illustration of a simplified block diagram of a video encoder in accordance with an embodiment.
Figure 4:
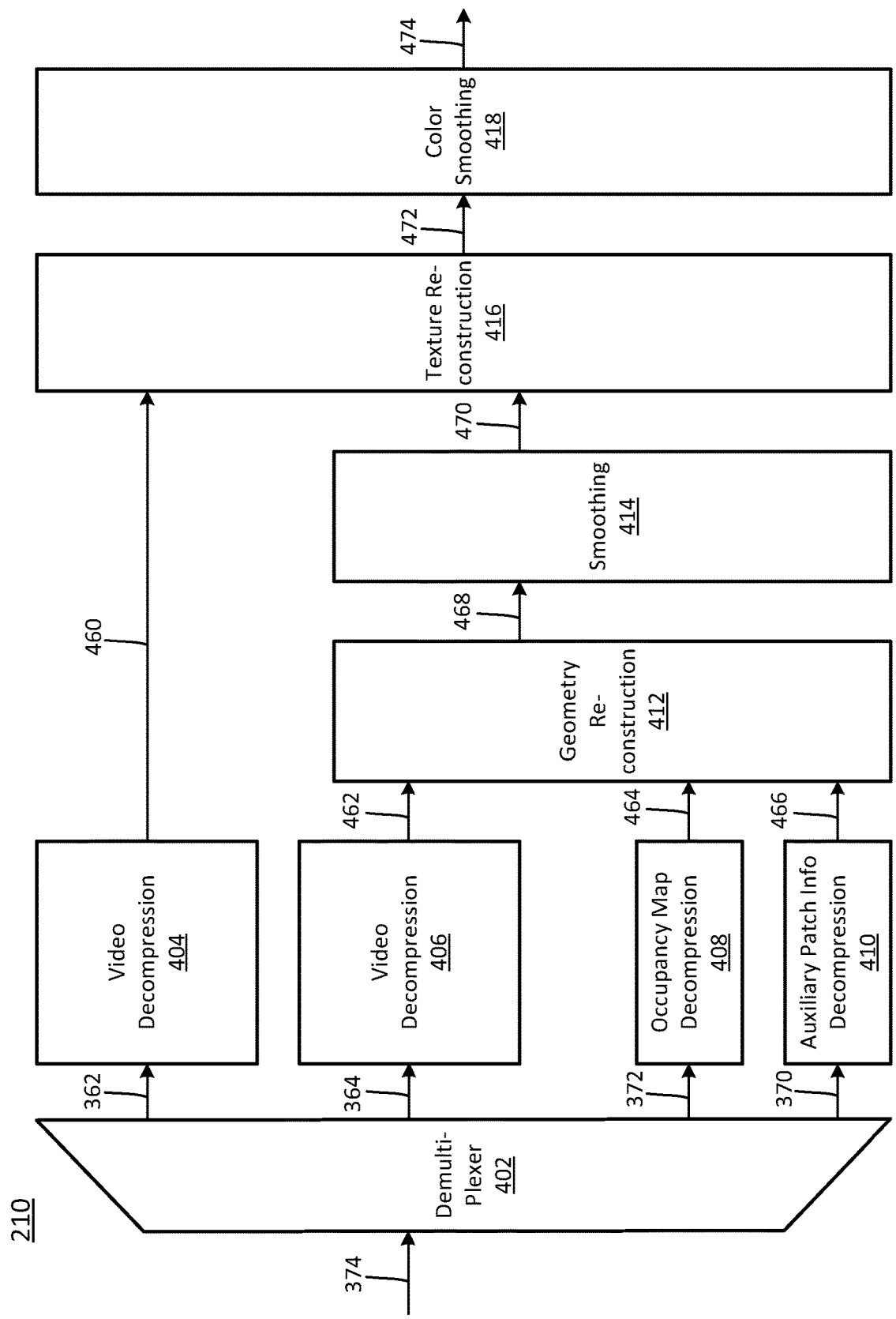
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

In embodiments, the geometry image generation module 306 generates the geometry image 352 and the texture image generation module 308 generates the texture image 356, based on the input point cloud frame 350 and the occupancy map 334. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

Patch Packing in Video-Based Point Cloud Compression (V-PCC)

In the MPEG PCC test model category 2 (TMC2) model, which may correspond to V-PCC, the patch packing process attempts to generate the geometry and texture maps, by efficiently placing the geometry or texture data that correspond to each generated patch onto a 2D grid of size W×H. Such placement may also account for a user-defined minimum size block T×T, which specifies the minimum distance between distinct patches as placed on this 2D grid. The corresponding value (T) may be encoded and sent to the decoder.

The packing method in TMC 2 may use an exhaustive search algorithm as follows:

Initially, patches are placed on a 2D grid in a manner that would guarantee non-overlapping insertion. Samples belonging to a patch (rounded to a value that is a multiple of T) are considered as occupied blocks.

In addition, a safeguard between adjacent patches is forced to distance of at least one block being multiple of T.

Patches are processed in an orderly manner, based on the patch index list. Each patch from the list is iteratively placed on the grid. The grid resolution depends on the original point cloud size and its width (W) and height (H) are transmitted to the decoder.

In the case that there is no empty space available for the next patch the height value of the grid is initially doubled and the insertion of this patch is evaluated again. If the insertion of all patches is successful, then the height is trimmed to the minimum needed value. However, this value is not allowed to be set lower than the originally specified value in the encoder.

The final values for W and H correspond to the frame resolution that is used to encode the texture and geometry video signals using the appropriate video codec.

In order to generate a video compression friendly packing result, a temporary consistent patch order adjustment method may be used to reorder the patches in the frame generated after the projection stage. The global patch allocation (GPA) packing method may be utilized to improve the temporally consistent packing within a group of frames.

Figure 5A:
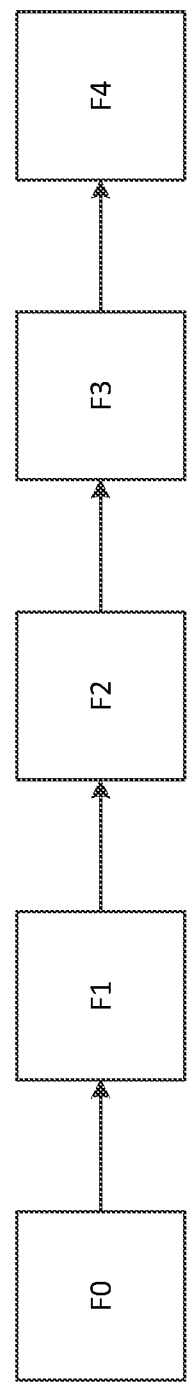
FIGS. 5A-5B illustrate examples of inter-frame dependency in a global patch allocation (GPA) design in accordance with an embodiment.
Figure 5B:
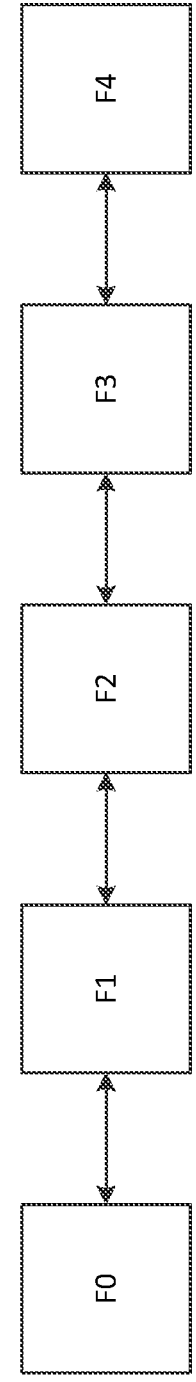
Figure 6:
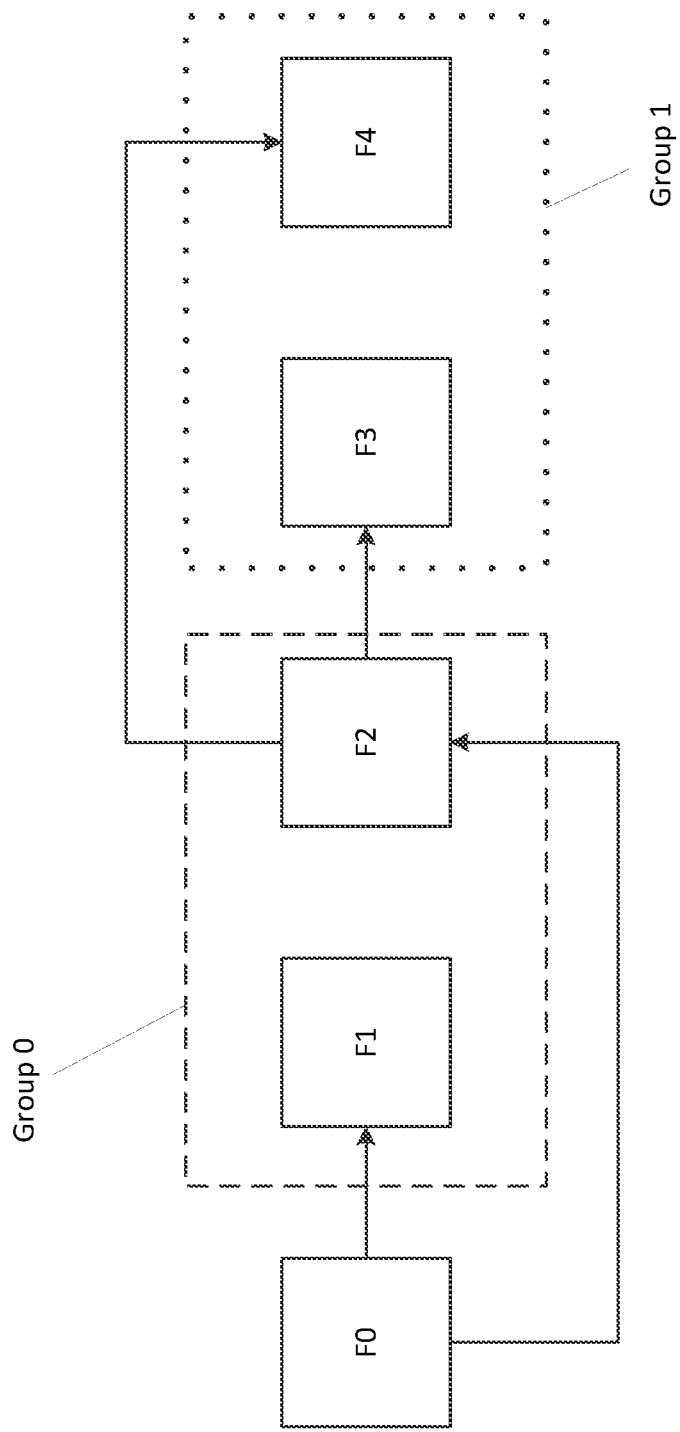
FIG. 6 illustrates an example GoP based patch packing with group size equal to two frames in accordance with an embodiment.

However, GPA assumes that the temporal correlation is from the nearest frames. FIG. 6 For example, the patches in frame T will find their matched patches in frame T−1 and/or frame T+1. FIGS. 5A-5B illustrate examples of inter-frame dependency in a global patch allocation (GPA) design in accordance with an embodiment. As shown in FIG. 5A, the current frame may be dependent on its previous frame only, or as shown in FIG. 5B, the current frame may be dependent on both its previous frame and next frame. Therefore, frame T cannot be processed until frame T−1 being processed. In other words, current frame must wait for its previous frame. This restriction hinders the possibility of parallel processing with multiple frames.

Embodiments be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

Embodiments may relate to a group of pictures (GoP) based patch packing method which may enable parallel processing with multiple frames.

An example embodiment may proceed as follows:

Frames can be divided into groups, where temporally neighboring frames can be put in the same group.

In embodiments, the size of each group can be set equally. The size can be assumed by both encoder and decoder, or the size can be signaled in the bitstream.

In embodiments, the size of each group can be different. For example, when the patched frames are less changed, a large size can be used. To indicate the size of the following group, a GoP level signaling can be used. A predictive signaling method can be used to signal only the delta size relative to previous size information.

Frames in the same group may depend on frames that are not in the group and have already been processed. In this case, the frames in the same group may be processed in parallel.

In embodiments, the use of GoP based patch packing may break the original correlation of patches in the nearest frames. However, the unidirectional/bidirectional correlation from nearest frames (as shown in FIGS. 5A-5B) can be recovered by certain propagation rules.

In embodiments, the frames, except the first frame of a sequence, may be grouped by every two neighboring frames, as shown in FIG. 6. F0 can be processed first independently. F1 and F2 are in the same group, and they are depending on the same frame F0. In this case, F0 is out of the group and has already been processed prior to this group. Similarly, F3 and F4 are in the same group, and they are depending on the same frame F2. F2 is out of the group and has already been processed prior to this group. Therefore, F1 and F2 can be processed in parallel after F0 is processed, and F3 and F4 can be processed in parallel after F2 is processed.

Figure 7:
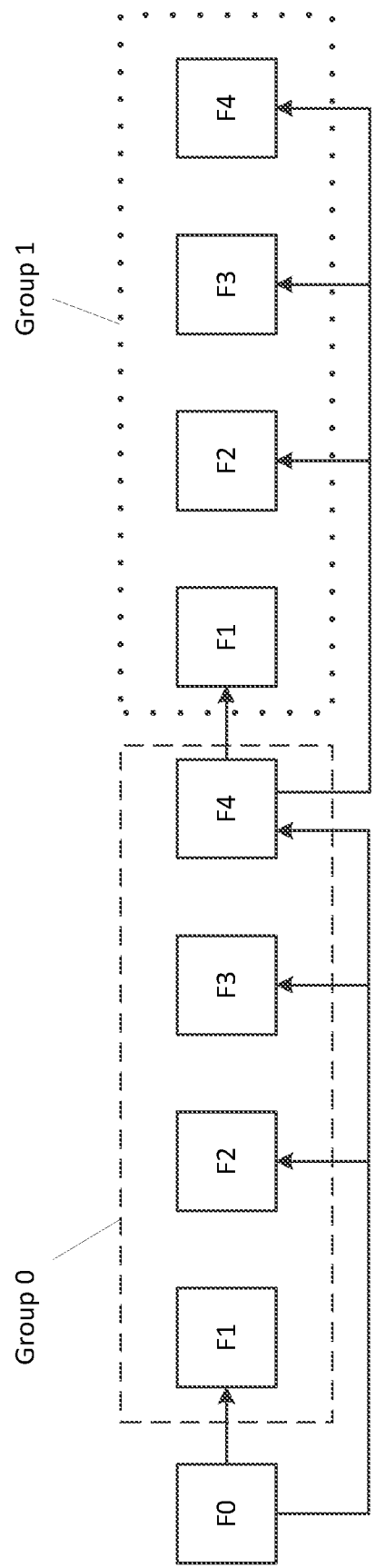
FIG. 7 illustrates an example GoP based patch packing with group size equal to four frames in accordance with an embodiment.

In embodiments, the frames, except the first frame of a sequence, may be grouped by every four neighboring frames, as shown in FIG. 7. F0 can be processed first independently. Frames from F1 to F4 are in the same group, and they are depending on the same frame F0. F0 is out of the group and has already been processed prior to this group. Similarly, frames from F5 to F8 are in the same group, and they are depending on the same frame F4. F4 is out of the group and has already been processed prior to this group. Therefore, Frames from F1 to F4 can be processed in parallel after F0 is processed, and frames from F5 to F8 can be processed in parallel after F4 is processed.

Figure 8A:
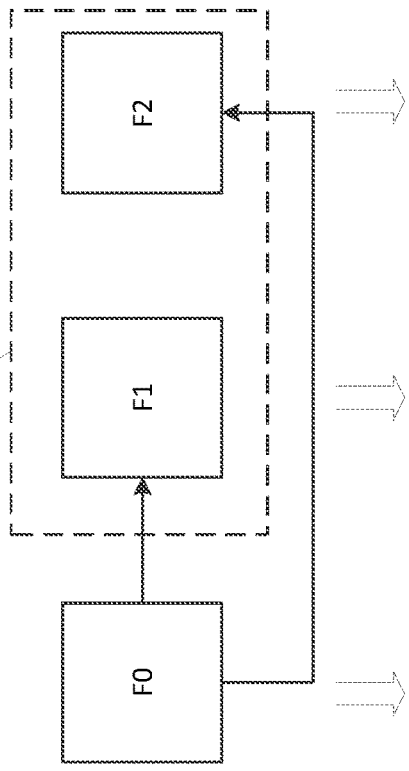
FIGS. 8A-8B illustrate an example patch correlation propagation to nearest neighboring frames in accordance with an embodiment.
Figure 8A:
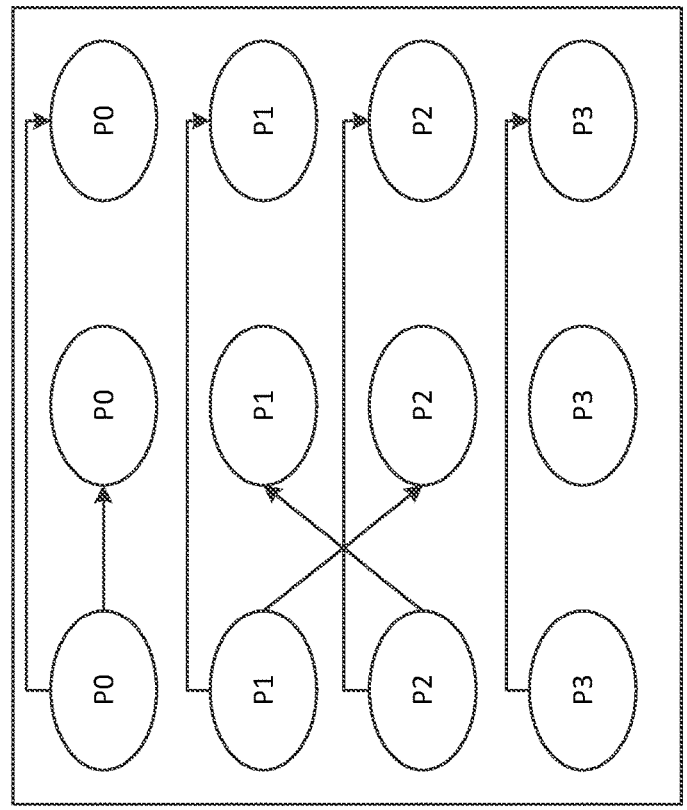
Figure 8B:
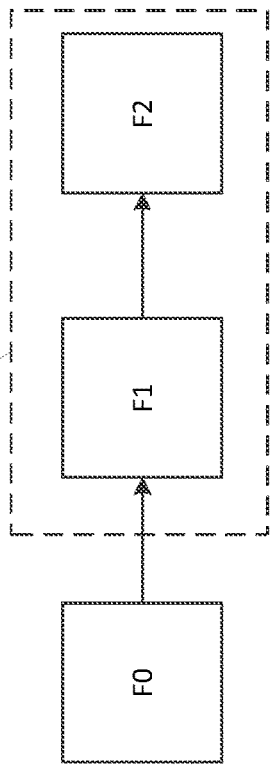
Figure 8B:
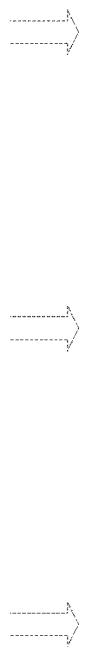
Figure 8B:
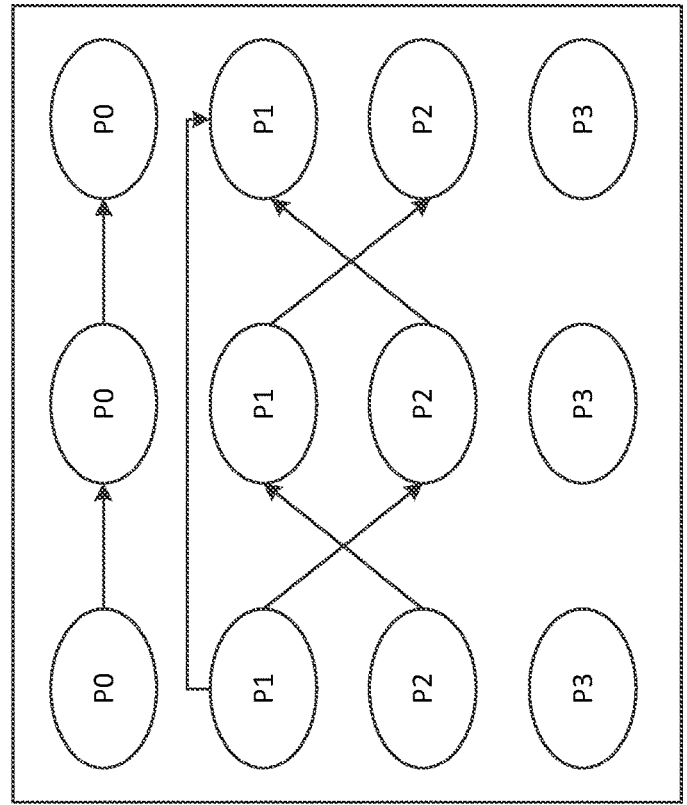

Embodiments of GoP based patch packing may break the assumption in the current GPA that temporal correlation is from the nearest frames as shown in FIG. 5A-5B. Therefore, a propagation method can be applied to recover the patch correlations among nearest neighboring frames based on the derived patch correlations in the proposed GoP based patch packing. FIGS. 8A-8B illustrate an example patch correlation propagation to nearest neighboring frames in accordance with an embodiment. In particular, FIG. 8A illustrates patch correlation before patch tracking propagation is performed, and FIG. 8B illustrates patch correlation after patch tracking propagation is formed.

One example is shown in FIG. 8A, where the GoP based patch packing is enabled. F1 and F2 are in the same group, and they are both depending on F0. Suppose each frame has four patches, i.e., P0 to P3. The patch correlations derived by the GoP based patch packing may be shown in FIG. 8A, in which the patches in F1 find correspondences in F0, and the patches in F2 find correspondences in F0 as well.

By performing propagation, one can find the patch correspondence between F1 and F2, as shown in FIG. 8B. For example, P0 in F2 and P0 in F1 are related because they both correspond to P0 in F0. In another example, P1 in F2 and P2 in F1 are related because they both correspond to P1 in F0.

In a third example, P2 in F2 and P1 in F1 are related because they both correspond to P2 in F0. In a fourth example, P3 in F2 and P3 in F1 are not related because they fail to find a same correspondence in F0. In this way, one can predict the patch correspondence between neighboring frames from the GoP based patch packing, if needed.

Figure 9:
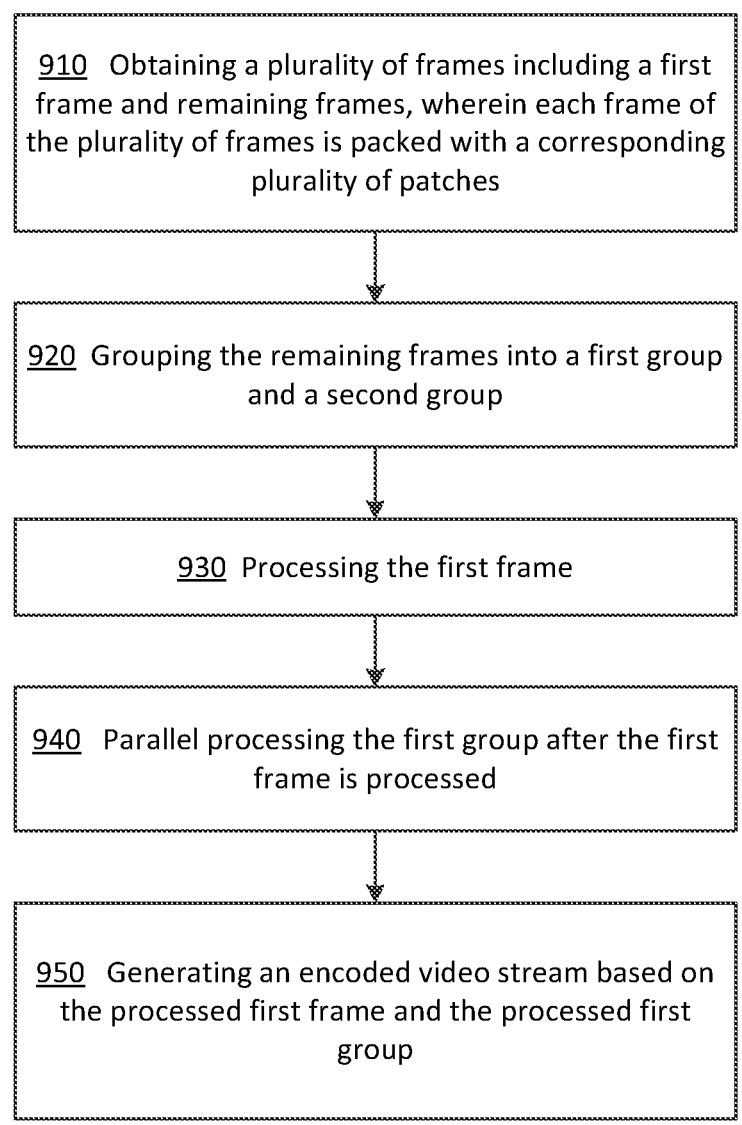
FIG. 9 is a flow diagram illustrating a process performed by an embodiment.

FIG. 9 is a flowchart of a method 900 of encoding a video stream using video point cloud coding. In some implementations, one or more process blocks of FIG. 9 may be performed by encoder 203. In some implementations, one or more process blocks of FIG. 9 may be performed by another device or a group of devices separate from or including the encoder 203, such as the decoder 210.

As shown in FIG. 9, in operation 910, the method 900 may include obtaining a plurality of frames including a first frame and remaining frames, wherein each frame of the plurality of frames is packed with a corresponding plurality of patches. In embodiments, the first frame may correspond to F0 discussed above.

In operation 920, the method 900 may include grouping the remaining frames into a first group and a second group, wherein frames grouped into same group may be temporally neighboring. In embodiments, the first group may correspond to Group 0 discussed above, and the second group may correspond to Group 1 discussed above. In embodiments, the remaining frames may be grouped such that at least one frame of the first group may depend from the first frame, at least one frame of the second group may depend from a frame of the first group, and no frames of the second group may depend from the first frame.

In operation 930, the method 900 may include processing the first frame.

In operation 940, the method 900 may include parallel processing frames in the first group after the first frame is processed. In embodiments, the parallel processing may include processing one or more frames of the first group in parallel with each other.

In operation 950, the method 900 may include generating an encoded video stream based on the processed first frame, the processed first group, and the processed second group.

In embodiments, the method 900 may include parallel processing frames in the second group after the first group is processed, and the encoded video stream may be further generated based on the processed frames in the second group. In embodiments, the parallel processing may include processing one or more frames of the second group in parallel with each other.

In embodiments, a size of the first group and a size of the second group may be an equal size.

In embodiments, the equal size may be signaled in the encoded video stream.

In embodiments, a size of the first group may be different from a size of the second group.

In embodiments, the size of the first group may be signaled in the encoded video stream, and a difference between the size of the first group and the size of the second group may be signaled in the encoded video stream.

In embodiments, the method may further include determining at least one of a first patch correspondence between patches included in the first group and a second patch correspondence between patches included in the second group, and the encoded video stream may be generated based on the at least one of the first patch correspondence and the second patch correspondence.

Although FIG. 9 shows example blocks of the method 900, in some implementations, the method 900 may include additional blocks, fewer blocks, different blocks, or differently arranged blocks than those depicted in FIG. 9 Additionally, or alternatively, two or more of the blocks of the method 900 may be performed in parallel.

Figure 10:
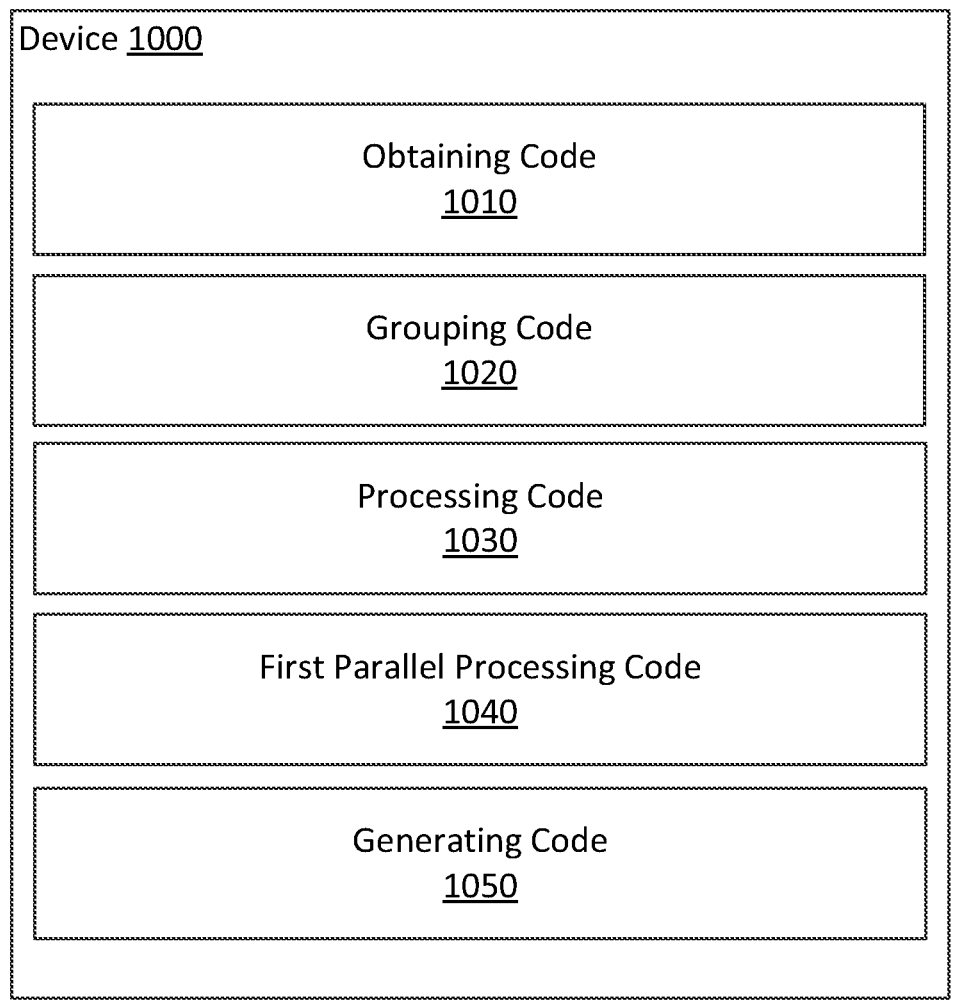
FIG. 10 is a diagram illustrating a device in accordance with an embodiment.

FIG. 10 is a diagram of an apparatus 1000 for encoding a video stream using video point cloud coding, according to embodiments. As shown in FIG. 10, the apparatus 800 includes obtaining code 1010, grouping code 1020, processing code 1030, first parallel processing code 1040, and generating code 1050.

The obtaining code 1010 may be configured to cause the at least one processor to obtain a plurality of frames including a first frame and remaining frames, wherein each frame of the plurality of frames is packed with a corresponding plurality of patches. In embodiments, the first frame may correspond to F0 discussed above.

The grouping code 1020 may be configured to cause the at least one processor to group the remaining frames into a first group and a second group, wherein frames grouped into same group may be temporally neighboring. In embodiments, the first group may correspond to Group 0 discussed above, and the second group may correspond to Group 1 discussed above. In embodiments, the remaining frames may be grouped such that at least one frame of the first group may depend from the first frame, at least one frame of the second group may depend from a frame of the first group, and no frames of the second group may depend from the first frame.

The processing code 1030 may be configured to cause the at least one processor to process the first frame.

The first parallel processing code 1040 may be configured to cause the at least one processor to parallel process the first group after the first frame is processed. In embodiments, the parallel processing may include processing one or more frames of the first group in parallel with each other.

The generating code 1050 may be configured to cause the at least one processor to generate an encoded video stream based on the processed first frame, the processed first group, and the processed second group.

In embodiments, the device 1000 may further include code configured to cause the at least one processor to parallel process the second group after the first group is processed, and the encoded video stream may be generated based on the processed frames in the second group. In embodiments, the parallel processing may include processing one or more frames of the second group in parallel with each other.

The techniques, described above, can be implemented as computer software using computer-readable instructions and physically stored in one or more computer-readable media. For example, FIG. 11 shows a computer system 1100 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
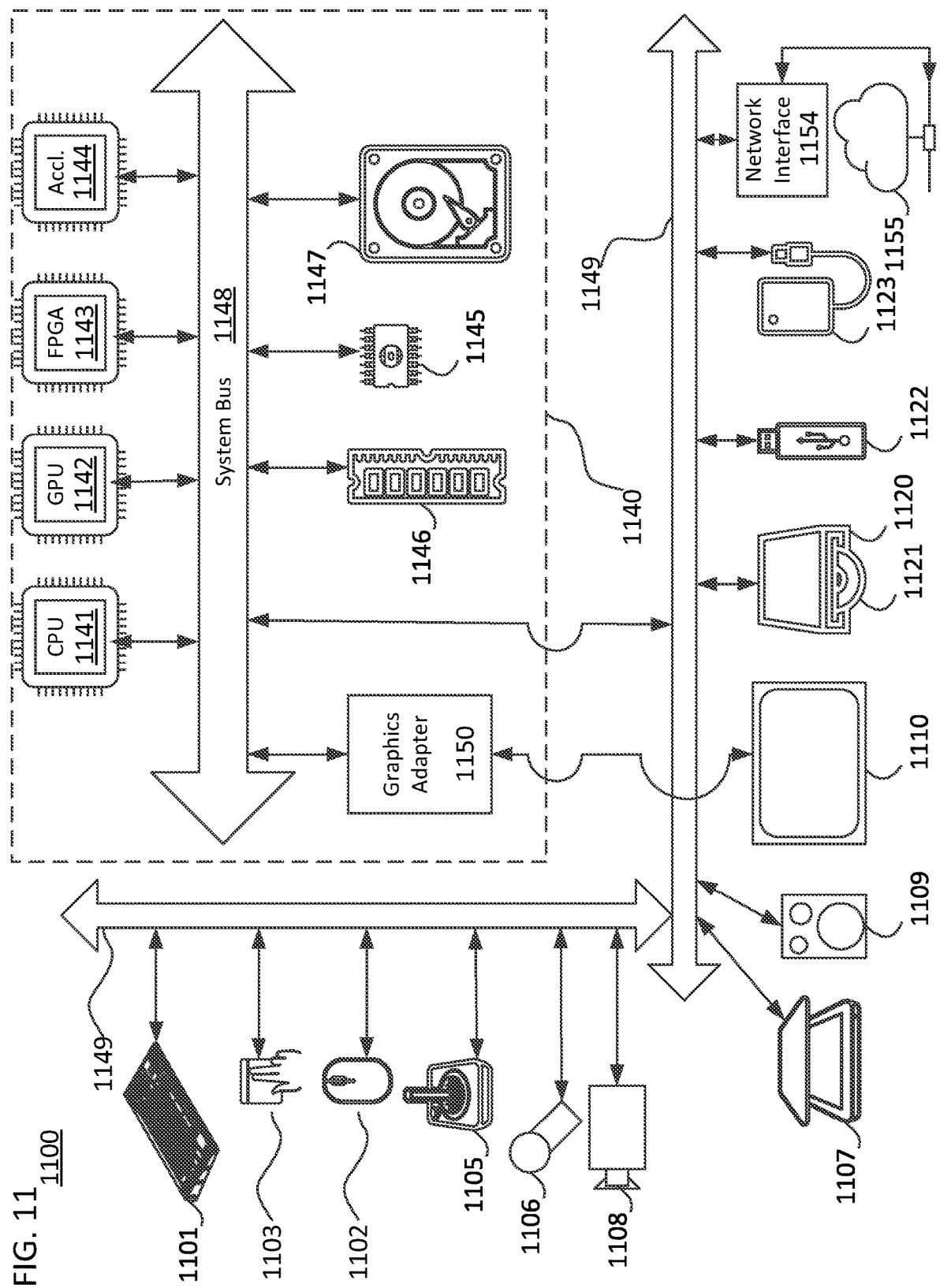
FIG. 11 is a diagram of a computer system suitable for implementing embodiments.

The components shown in FIG. 11 for computer system 1100 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1100.

Computer system 1100 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, data-glove, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data glove, or joystick 1105, but there can also be tactile feedback devices that do not serve as input devices). For example, such devices may be audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1100 can also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1149 (such as, for example USB ports of the computer system 1100; others are commonly integrated into the core of the computer system 1100 by attachment to a system bus as described below (for example Ethernet interface into a PC computer system or cellular network interface into a smartphone computer system). Using any of these networks, computer system 1100 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1155. Certain protocols and protocol stacks can be used on each of those networks and network interfaces as described above.

Aforementioned human interface devices, human-accessible storage devices, and network interfaces 1154 can be attached to a core 1140 of the computer system 1100.

The core 1140 can include one or more Central Processing Units (CPU) 1141, Graphics Processing Units (GPU) 1142, specialized programmable processing units in the form of Field Programmable Gate Areas (FPGA) 1143, hardware accelerators for certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148. In some computer systems, the system bus 1148 can be accessible in the form of one or more physical plugs to enable extensions by additional CPUs, GPU, and the like. The peripheral devices can be attached either directly to the core's system bus 1148, or through a peripheral bus 1149. Architectures for a peripheral bus include PCI, USB, and the like. A graphics adapter 1150 may be included in the core 1140.

CPUs 1141, GPUs 1142, FPGAs 1143, and accelerators 1144 can execute certain instructions that, in combination, can make up the aforementioned computer code. That computer code can be stored in ROM 1145 or RAM 1146. Transitional data can be also be stored in RAM 1146, whereas permanent data can be stored for example, in the internal mass storage 1147. Fast storage and retrieve to any of the memory devices can be enabled through the use of cache memory, that can be closely associated with one or more CPU 1141, GPU 1142, mass storage 1147, ROM 1145, RAM 1146, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1100, and specifically the core 1140 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1140 that are of non-transitory nature, such as core-internal mass storage 1147 or ROM 1145. The software implementing various embodiments of the present disclosure can be stored in such devices and executed by core 1140. A computer-readable medium can include one or more memory devices or chips, according to particular needs. The software can cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system can provide functionality as a result of logic hardwired or otherwise embodied in a circuit (for example: accelerator 1144), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of encoding a video stream using video point cloud coding, the method being performed by at least one processor and comprising:
    obtaining a plurality of frames including a first frame and remaining frames, wherein each frame of the plurality of frames is packed with a corresponding plurality of patches;
    grouping the remaining frames into a first group and a second group, wherein frames grouped into same group are temporally neighboring, wherein at least one frame of the first group depends from the first frame, and wherein no frame in the first group depends on any other frames in the first group;
    processing the first frame;
    parallel processing frames in the first group after the first frame is processed; and
    generating an encoded video stream based on the processed first frame and the processed frames in the first group.

2. The method of claim 1, further comprising parallel processing frames in the second group after the first group is processed,
    wherein at least one frame of the second group depends from a frame of the first group,
    wherein no frames of the second group depend from the first frame, and
    wherein the encoded video stream is generated based on the processed frames in the second group.

3. The method of claim 1, wherein a size of the first group and a size of the second group are an equal size.

4. The method of claim 3, wherein the equal size is signaled in the encoded video stream.

5. The method of claim 1, wherein a size of the first group is different from a size of the second group.

6. The method of claim 5, wherein the size of the first group is signaled in the encoded video stream, and
    wherein a difference between the size of the first group and the size of the second group is signaled in the encoded video stream.

7. The method of claim 1, further comprising determining at least one of a first patch correlation between patches included in the first group and patches included in the first frame and a second patch correlation between patches included in the second group and patches included in at least one frame of the first group,
    wherein the encoded video stream is generated based on the at least one of the first patch correlation and the second patch correlation.

8. An apparatus for encoding a video stream using video point cloud coding, the apparatus comprising:
    at least one memory configured to store program code; and
    at least one processor configured to read the program code and operate as instructed by the program code, the program code comprising:
        obtaining code configured to cause the at least one processor to obtain a plurality of frames including a first frame and remaining frames, wherein each frame of the plurality of frames is packed with a corresponding plurality of patches;
        grouping code configured to cause the at least one processor to group the remaining frames into a first group and a second group, wherein frames grouped into same group are temporally neighboring, wherein at least one frame of the first group depends from the first frame, and wherein no frame in the first group depends on any other frames in the first group;
        processing code configured to cause the at least one processor to process the first frame;
        first parallel processing code configured to cause the at least one processor to parallel process frames in the first group after the first frame is processed; and
        generating code configured to cause the at least one processor to generate an encoded video stream based on the processed first frame and the processed frames in the first group.

9. The apparatus of claim 8, wherein the program code further comprises second parallel processing code configured to cause the at least one processor to parallel process frames in the second group after the first group is processed,
    wherein at least one frame of the second group depends from a frame of the first group, and
    wherein no frames of the second group depend from the first frame, and
    wherein the encoded video stream is generated based on the processed frames in the second group.

10. The apparatus of claim 8, wherein a size of the first group and a size of the second group are an equal size.

11. The apparatus of claim 10, wherein the equal size is signaled in the encoded video stream.

12. The apparatus of claim 8, wherein a size of the first group is different from a size of the second group.

13. The apparatus of claim 12, wherein the size of the first group is signaled in the encoded video stream, and
    wherein a difference between the size of the first group and the size of the second group is signaled in the encoded video stream.

14. The apparatus of claim 8, wherein the program code further comprises determining configured to cause the at least one processor to determine at least one of a first patch correlation between patches included in the first group and patches included in the first frame and a second patch correlation between patches included in the second group and patches included in at least one frame of the first group,
    wherein the encoded video stream is generated based on the at least one of the first patch correlation correspondence and the second patch correlation correspondence.

15. A non-transitory computer-readable medium storing computer instructions for encoding a video stream using video point cloud coding that, when executed by at least one processor, cause the at least one processor to:
- obtain a plurality of frames including a first frame and remaining frames, wherein each frame of the plurality of frames is packed with a corresponding plurality of patches;
- group the remaining frames into a first group and a second group, wherein frames grouped into same group are temporally neighboring, wherein at least one frame of the first group depends from the first frame, and wherein no frame in the first group depends on any other frames in the first group;
- process the first frame;
- parallel process frames in the first group after the first frame is processed; and
- generate an encoded video stream based on the processed first frame, the processed frames in the first group.

16. The non-transitory computer-readable medium of claim 15, wherein the instructions further cause the at least one processor to parallel process frames in the second group after the first group is processed,
- wherein at least one frame of the second group depends from a frame of the first group,
- wherein no frames of the second group depend from the first frame, and
- wherein the encoded video stream is generated based on the processed frames in the second group.

17. The non-transitory computer-readable medium of claim 15, wherein a size of the first group and a size of the second group are an equal size.

18. The non-transitory computer-readable medium of claim 17, wherein the equal size is signaled in the encoded video stream.

19. The non-transitory computer-readable medium of claim 15, wherein a size of the first group is different from a size of the second group.

20. The non-transitory computer-readable medium of claim 15, wherein the instructions further cause the at least one processor to determine at least one of a first patch correlation between patches included in the first group and patches included in the first frame and a second patch correspondence between patches included in the second group and patches included in at least one frame of the first group,
- wherein the encoded video stream is generated based on the at least one of the first patch correlation correspondence and the second patch correlation correspondence.

* * * * *